(12) United States Patent
Hirai

(10) Patent No.: US 8,998,628 B2
(45) Date of Patent: Apr. 7, 2015

(54) ROTATABLE CONNECTOR DEVICE

(71) Applicants: Furukawa Electric Co., Ltd., Tokyo (JP); Furukawa Automotive Systems Inc., Shiga (JP)

(72) Inventor: Shuji Hirai, Shiga (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 39 days.

(21) Appl. No.: 13/898,224

(22) Filed: May 20, 2013

(65) Prior Publication Data

US 2013/0252442 A1 Sep. 26, 2013

Related U.S. Application Data

(63) Continuation of application No. PCT/JP2011/076763, filed on Nov. 21, 2011.

(30) Foreign Application Priority Data

Nov. 19, 2010 (JP) .................................. 2010-258898

(51) Int. Cl.
*H01R 35/04* (2006.01)
*B60R 16/027* (2006.01)
(52) U.S. Cl.
CPC .............. *B60R 16/027* (2013.01); *H01R 35/04* (2013.01)
(58) Field of Classification Search
USPC .................................................... 439/15, 164
See application file for complete search history.

(56) References Cited

U.S. PATENT DOCUMENTS

| 5,766,028 A * | 6/1998 | Ichikawa et al. ............... 439/164 |
| 6,462,290 B1 * | 10/2002 | Matsumoto ..................... 439/15 |
| 6,764,326 B2 * | 7/2004 | Matsumoto et al. .......... 439/164 |
| 7,425,143 B2 * | 9/2008 | Mitsui ........................... 439/164 |
| 7,445,451 B2 * | 11/2008 | Tanaka et al. .................. 439/15 |

FOREIGN PATENT DOCUMENTS

| JP | 05-021108 A | 1/1993 |
| JP | 2001-126836 A | 5/2001 |
| JP | 2005-327575 A | 11/2005 |

OTHER PUBLICATIONS

International Search Report issued in Application No. PCT/JP2011/076763, dated Dec. 20, 2011 (1 page).

* cited by examiner

*Primary Examiner* — Tho D Ta
(74) *Attorney, Agent, or Firm* — Osha Liang LLP

(57) ABSTRACT

A fixed-side ring plate rotation regulation section is provided at an outer circumferential edge of a fixed-side ring plate, and an outer cylinder rotation regulation section is provided at an outer circumferential edge of an outer cylinder at a position corresponding to the fixed-side ring plate rotation regulation section. The fixed-side ring plate and the outer cylinder formed of different members from each other are fit to each other such that the fixed-side ring plate rotation regulation section and the outer cylinder rotation regulation section are in contact with each other so as not to rotate about a rotation axis thereof.

3 Claims, 8 Drawing Sheets

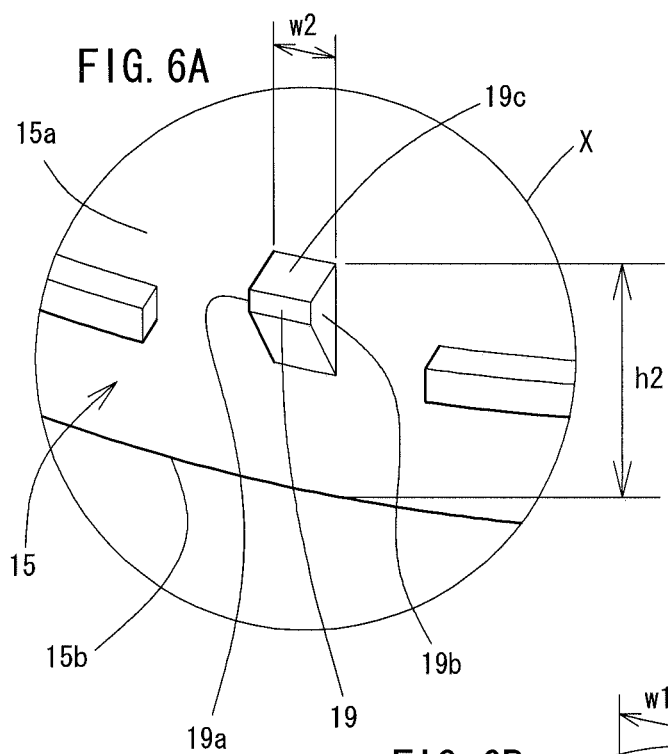
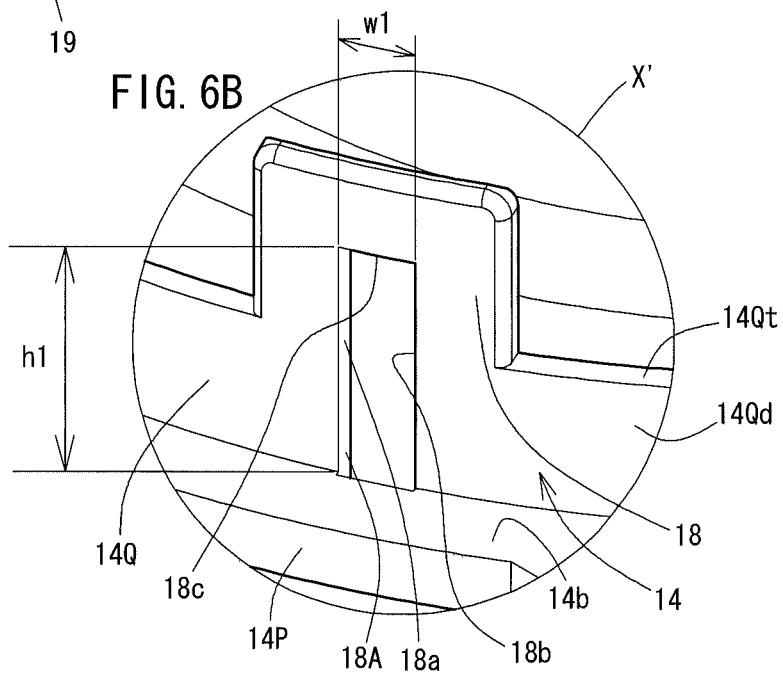

ROTATABLE CONNECTOR DEVICE

TECHNICAL FIELD

The present invention relates to a rotatable connector device for electrically connecting elements on the side of a vehicle body of an automobile and elements on the side of a steering wheel to each other.

BACKGROUND ART

Conventionally, various types of rotatable connector devices for electrically connecting a fixed side and a rotatable side rotatable with respect to the fixed side to each other are known. For example, one type of rotatable connector device electrically connects elements on the side of a vehicle body of an automobile and elements on the side of a steering wheel to each other.

In general, a steering wheel of an automobile includes an airbag or the like which is required to operate without fail in emergency. Therefore, a slidable electrode or the like having low dependability of connection is not used, and a rotatable connector device having built-in flat cables or the like for connecting elements on the side of the vehicle body and elements on the side of the steering wheel to each other is used.

The above-described rotatable connector device mounted on an automobile includes a cylindrical fixed case fixed to the vehicle body and a cylindrical rotatable case attached to the steering wheel. The fixed case and the rotatable case are engaged to each other so as to be rotatable with respect to each other. In a ring-shaped accommodation space defined by the fixed case and the rotatable case, flat cables are accommodated as being wound a plurality of times.

The flat cables are connected to fixed case-side connectors provided on the fixed case, and rotatable case-side connectors provided on the rotatable case. In the ring-shaped internal accommodation space, the flat cables are wound in one direction, then is turned around in a U shape to have the winding direction thereof reversed, and is wound in the opposite direction. Owing to such a structure, the rotatable connector device can rotate the rotatable case clockwise and counterclockwise in correspondence with the number of winds of the flat cables.

The fixed case of the above-described rotatable connector device is formed of a plastic material, and as shown in FIG. 1 of Patent Document 1, is easy to mold. Therefore, the fixed case includes two members, namely, a ring-shaped flat fixed-side ring plate and an outer cylinder having a cylindrical shape and extending perpendicularly from an outer circumferential edge of the fixed-side ring plate. The fixed-side ring plate and the outer cylinder are fit to each other.

The fixed-side ring plate and the outer cylinder are coupled to each other as follows, for example. A plurality of engaging hole sections projecting from the outer circumferential edge of the fixed-side ring plate perpendicularly to the fixed-side ring plate and each having an engaging hole, and a plurality of engaging convexed sections located on an outer circumferential edge of the outer cylinder at positions corresponding to the engaging hole sections and projecting radially outward, are engaged with each other. Thus, the fixed case is formed.

In this case, since the engaging hole sections located at the plurality of positions along the outer circumferential edge, and the engaging convexed sections located at the plurality of positions along the outer circumferential edge, are engaged with each other, the fixed-side ring plate and the outer cylinder are fixed to each other strongly in a direction of a rotation axis. However, in order to facilitate a work of coupling the fixed-side ring plate and the outer cylinder, play is provided in the circumferential direction at engaging positions of the engaging hole sections and the engaging convexed sections.

Because of this, in the state where the fixed case of the rotatable connector device is assembled to the vehicle body, the outer cylinder becomes rickety easily in the circumferential direction with respect to the fixed-side ring plate, which is fixed strongly to the vehicle body by a crush rib and a snap-fit. Thus, squeaky noise is likely to be generated. Especially in the case where the rotatable connector device is attached to the vehicle body in an eccentric state, the outer cylinder becomes rickety easily in the circumferential direction, which causes a problem that the squeaky noise is likely to be generated.

CITATION LIST

Patent Literature

Patent Document 1: Japanese Laid-Open Patent Publication No. Hei 5-21108

SUMMARY OF INVENTION

Technical Problem

The present invention has an object of providing a rotatable connector device capable of suppressing generation of squeaky noise due to ricketiness of an outer cylinder in a circumferential direction with respect to a fixed-side ring plate.

Solution to Problem

The present invention is directed to a rotatable connector device including a fixed case including a ring-shaped fixed-side ring plate and an outer cylinder having a cylindrical shape and extending from an outer circumferential edge of the fixed-side ring plate perpendicularly to a planar surface of the fixed-side ring plate; and a rotatable case including a ring-shaped rotatable-side ring plate and an inner cylinder having a cylindrical shape and extending from an inner circumferential edge of the rotatable-side ring plate perpendicularly to a planar surface of the rotatable-side ring plate toward the fixed case. The fixed case and the rotatable case are fit to each other so as to be rotatable with respect to each other in a clockwise direction and a counterclockwise direction; an accommodation section is defined by the fixed-side ring plate and the outer cylinder of the fixed case and the rotatable-side ring plate and the inner cylinder of the rotatable case; in the accommodation section, flat cables for electrically connecting the fixed case and the rotatable case to each other are accommodated in a wound state; the fixed-side ring plate and the outer cylinder are formed of different members; a fixed-side ring plate rotation regulation section is provided at the outer circumferential edge of the fixed-side ring plate; an outer cylinder rotation regulation section is provided at an outer circumferential edge of the outer cylinder, at a position corresponding to the fixed-side ring plate rotation regulation section; and the fixed-side ring plate and the outer cylinder are aligned so as to have the same rotation axis and are fit to each other in a direction of the rotation axis, and the fixed-side ring plate rotation regulation section is put into contact with the outer cylinder rotation regulation section so as not to rotate in either the clockwise direction or the counterclockwise direction about the rotation axis.

According to the present invention, the fixed-side ring plate rotation regulation section and the outer cylinder rotation regulation section are in contact with each other so as not to rotate in either the clockwise direction or the counterclockwise direction. Therefore, the outer cylinder does not easily move in the circumferential direction with respect to the fixed-side ring plate. Thus, generation of squeaky noise, which would be caused by ricketiness of the outer cylinder in the circumferential direction, can be suppressed.

In the present invention, one of the fixed-side ring plate rotation regulation section and the outer cylinder rotation regulation section may be a fitting convexed portion, and the other of the fixed-side ring plate rotation regulation section and the outer cylinder rotation regulation section may be a fitting concaved portion. The fitting convexed portion may be put into contact with, and fit to, the fitting concaved portion in the circumferential direction. Alternatively, both of the fitting convexed portion and the fitting concaved portion may be provided as the fixed-side ring plate rotation regulation section, and the fitting concaved portion and the fitting convexed portion may be provided as the outer cylinder rotation regulation section in correspondence with the fixed-side ring plate rotation regulation section.

Still alternatively, both of the fixed-side ring plate rotation regulation section and the outer cylinder rotation regulation section may be fitting convexed portions projecting respectively from an outer side surface of the fixed-side ring plate and an outer side surface of the outer cylinder.

In this case, for example, the fitting convexed portion of the fixed-side ring plate is put into contact with the fitting convexed portion of the outer cylinder at one position on the outer side surface so as not to rotate in the clockwise direction, and the second fitting convexed portion of the fixed-side ring plate is put into contact with the second fitting convexed portion of the outer cylinder at another position on the outer side surface so as not to rotate in the counterclockwise direction. Thus, the rotation of the outer cylinder can be regulated in both of the clockwise and counterclockwise directions.

In an embodiment according to the present invention, the fixed-side ring plate may include a plurality of engaging hole sections each having an engaging hole, the plurality of engaging hole sections projecting perpendicularly from the outer circumferential edge toward the outer cylinder and located at a prescribed interval in a circumferential direction; the outer cylinder may include a plurality of engaging convexed sections on an outer surface thereof at positions corresponding to the engaging hole sections, the plurality of engaging convexed sections projecting radially outward and located at a prescribed interval; and the fixed-side ring plate and the outer cylinder may be engaged with each other by insertion of the engaging convexed sections into the engaging hole sections in the direction of the rotation axis.

According to the present invention, since the engaging hole sections and the engaging convexed sections are engaged with each other in the direction of the rotation axis, the fixed-side ring plate and the outer cylinder can be coupled to each other strongly in the direction of the rotation axis. In addition, by fitting the fixed-side ring plate rotation regulation section and the outer cylinder rotation regulation section to each other also in the direction of the rotation axis, these sections can be put into contact with each other in the circumferential direction. Thus, the rotation of the outer cylinder with respect to the fixed-side ring plate in the circumferential direction can be regulated.

Namely, by fitting the fixed-side ring plate and the outer cylinder to each other merely in one direction, the movement of the outer cylinder with respect to the fixed-side ring plate can be regulated in both of the direction of the rotation axis and the circumferential direction.

In an embodiment according to the present invention, either one of the fixed-side ring plate rotation regulation section and the outer cylinder rotation regulation section may be a fitting convexed portion, and the other of the fixed-side ring plate rotation regulation section and the outer cylinder rotation regulation section may be a fitting concaved portion; and the fitting convexed portion may be in contact with, and thus fit to, the fitting concaved portion at both of two ends thereof in the circumferential direction.

According to the present invention, the fitting convexed portion and the fitting concaved portion are in contact with each other at both of two ends thereof in the circumferential direction. Therefore, merely one pair of the fitting convexed portion and the fitting concaved portion can suppress the ricketiness of the outer cylinder in both of the clockwise direction and the counterclockwise direction.

In an embodiment according to the present invention, a contact surface along which the fitting convexed portion and the fitting concaved portion contact each other may be in a radial direction.

According to the present invention, when a force is applied to the contact surface in the circumferential direction, the direction of the force is perpendicular to the contact surface. Therefore, the movement of the outer cylinder in the circumferential direction with respect to the fixed-side ring plate can be regulated most effectively.

Advantageous Effects of Invention

According to the present invention, a rotatable connector device capable of suppressing generation of squeaky noise due to ricketiness of an outer cylinder in a circumferential direction with respect to a fixed-side ring plate can be provided.

BRIEF DESCRIPTION OF DRAWINGS

FIGS. 6A and 6B are enlarged isometric views of an engaging hole section and an engaging convexed section.

DESCRIPTION OF EMBODIMENTS

Hereinafter, an embodiment of the present invention will be described with reference to the drawings.

Figure 1:
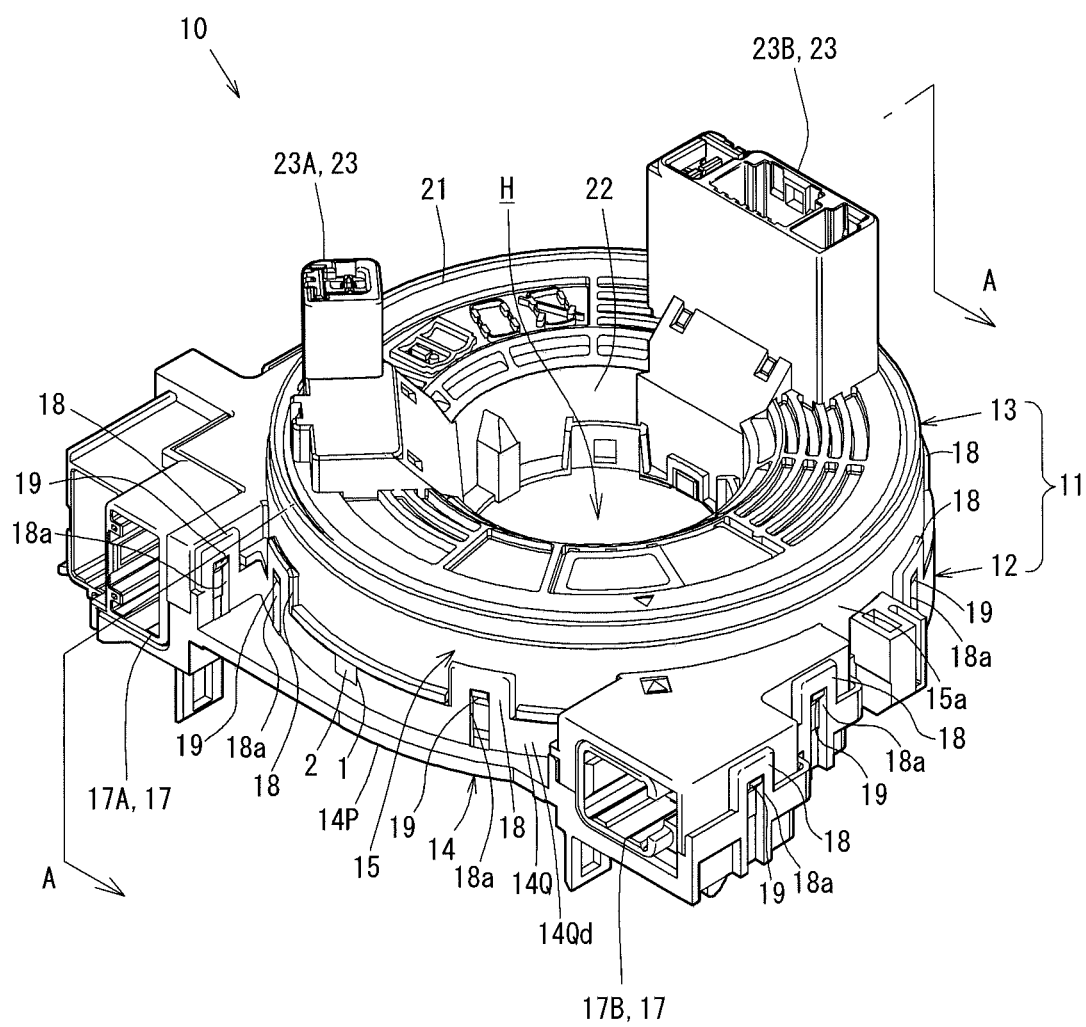
FIG. 1 is an isometric view showing an external appearance of a steering roll connector.
Figure 2:
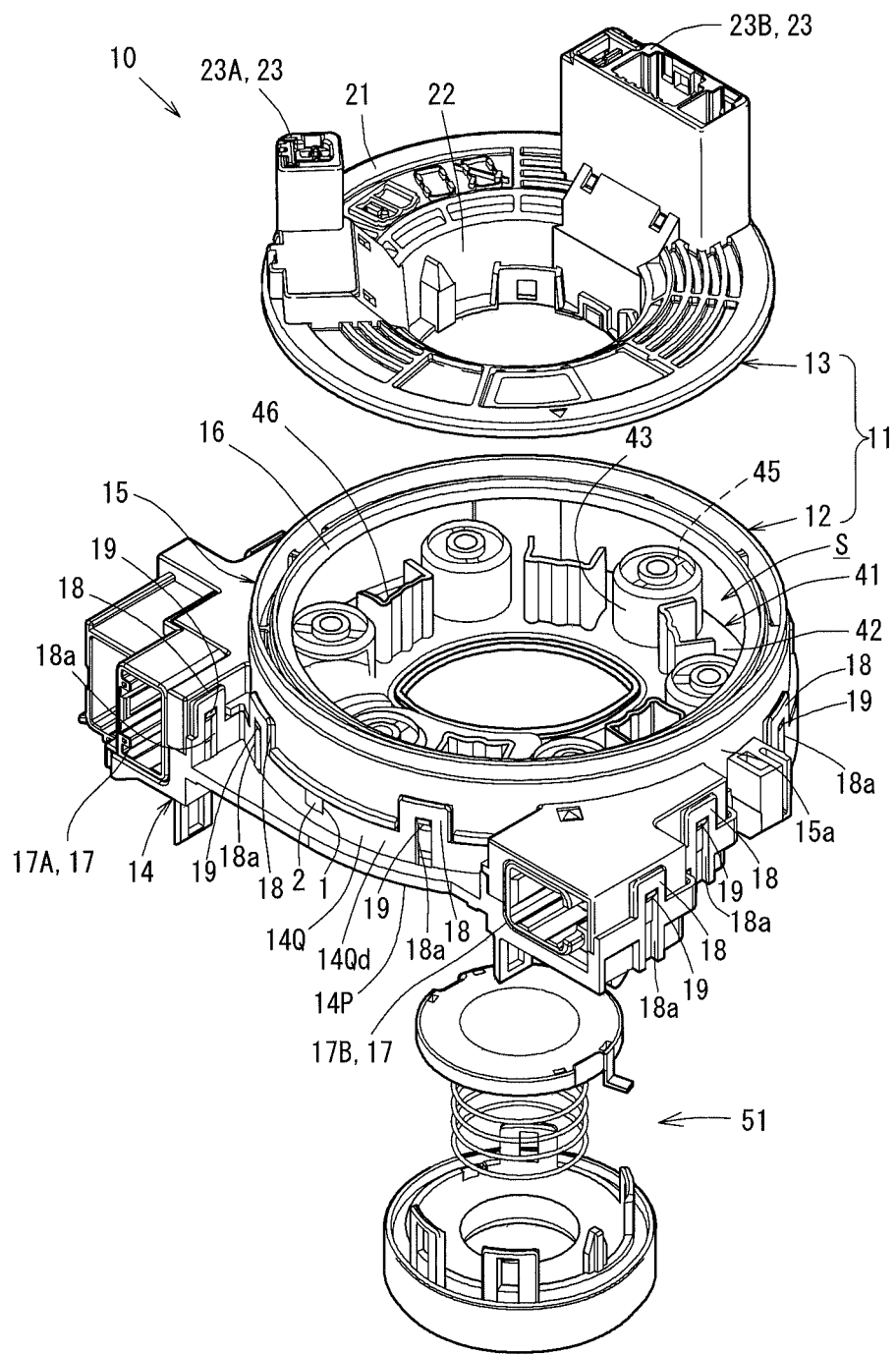
FIG. 2 is an exploded isometric view of the steering roll connector.

FIG. 1 is an isometric view showing an external appearance of a steering roll connector 10 in this embodiment. FIG. 2 is an exploded isometric view of the steering roll connector 10 shown in FIG. 1, showing a fixed case 12, a rotatable case 13 and a rotation clock structure 51.

Figure 3:
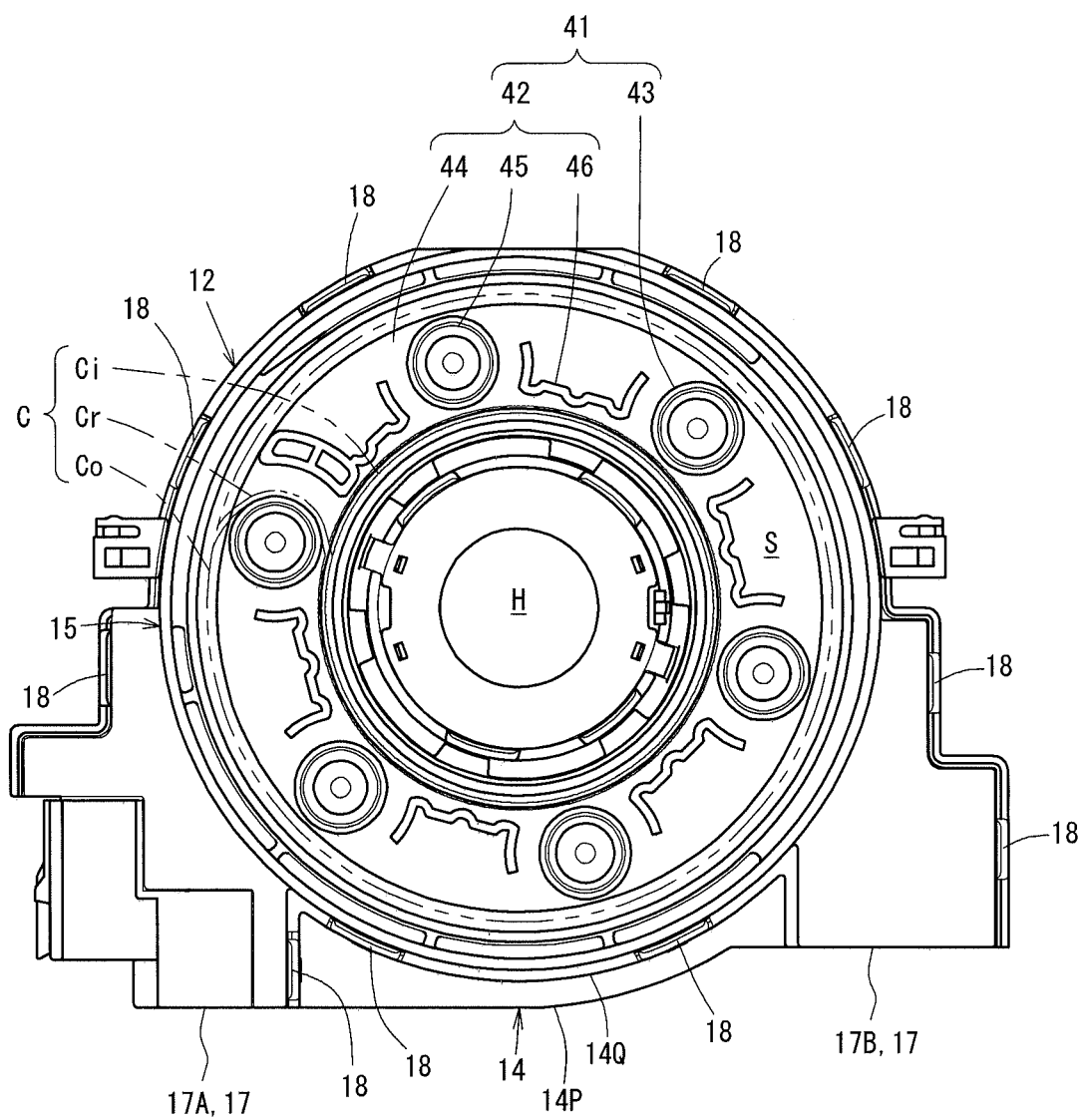
FIG. 3 is a plan view of the steering roll connector in the state where a rotatable case has been detached.
Figure 4:
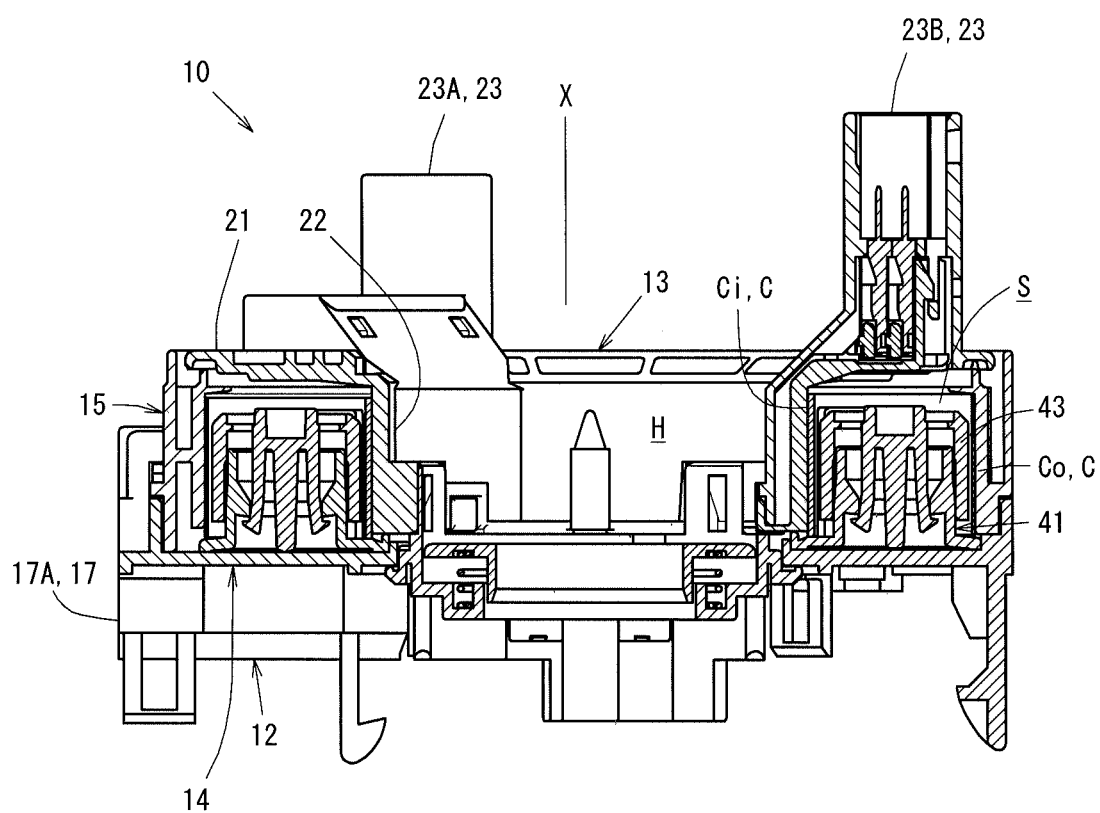
FIG. 4 is a cross-sectional view taken along line A-A in FIG. 1.
Figure 5:
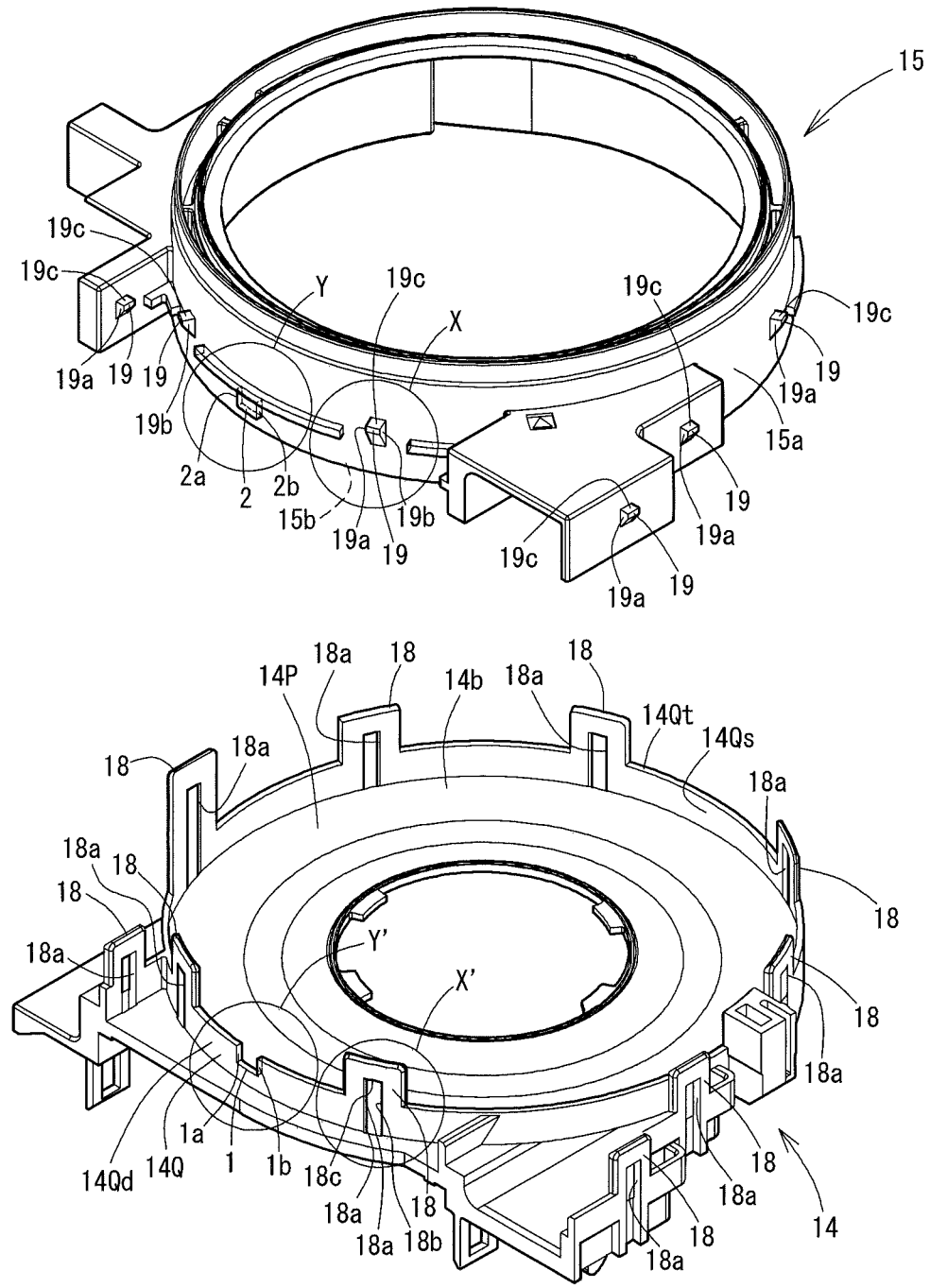
FIG. 5 is an exploded isometric view of a fixed case.

FIG. 3 is a plan view of the steering roll connector 10 in the state where the rotatable case 13 has been detached. FIG. 4 is a cross-sectional view taken along line A-A in FIG. 1. FIG. 5 is an exploded view of the fixed case 12, showing a fixed-side ring plate 14 and an outer cylinder 15.

Figure 7A:
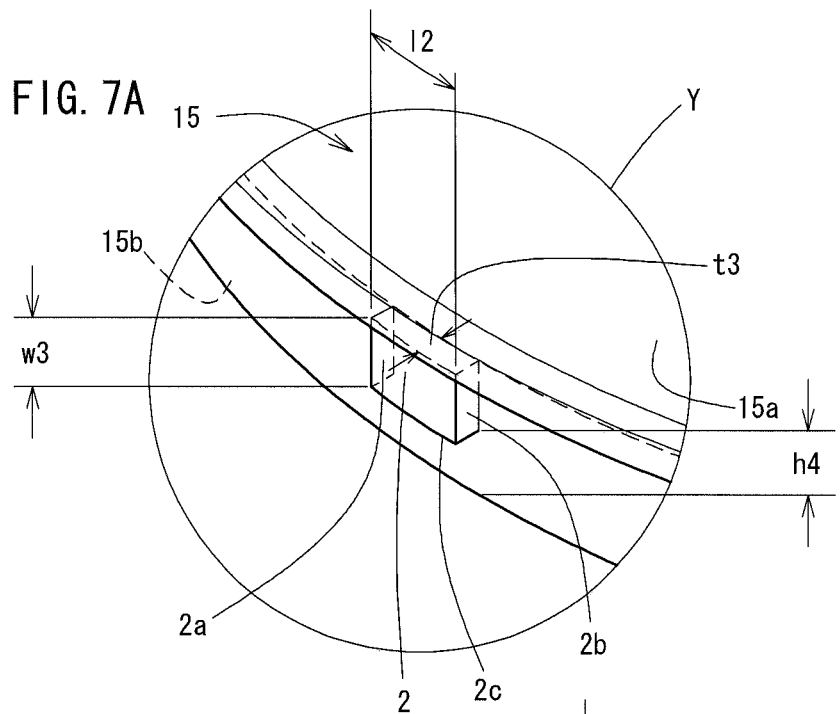
FIGS. 7A and 7B are enlarged isometric views of a fitting concaved portion and a fitting convexed portion.
Figure 7B:
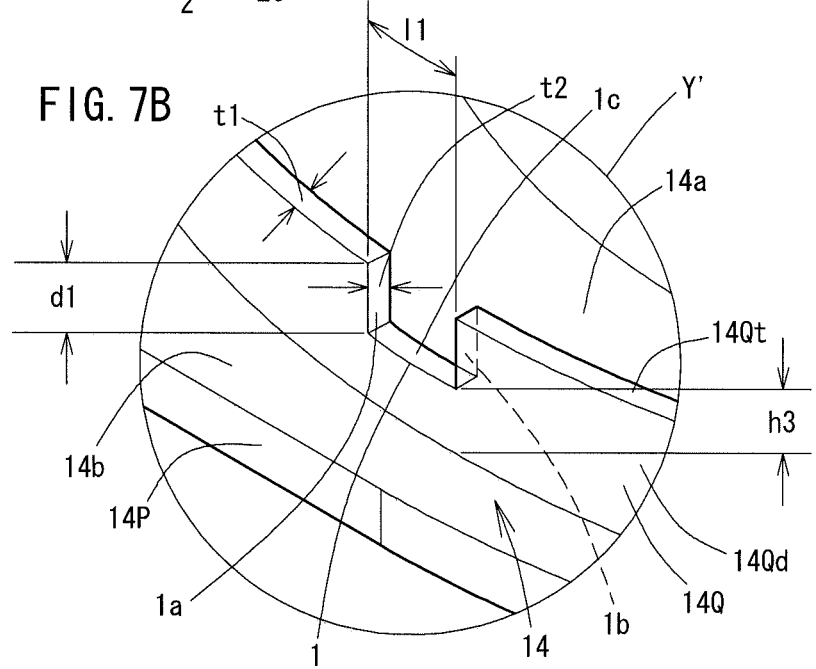

FIG. 6A is an enlarged view of an engaging convexed section 19 included in the outer cylinder 15, and FIG. 6B is an enlarged view of an engaging hole section 18 included in the fixed-side ring plate 14. FIG. 7A shows a fitting convexed portion 2 included in the outer cylinder 15, and FIG. 7B shows a fitting concaved portion 1 formed in the fixed-side ring plate 14.

Figure 8A:
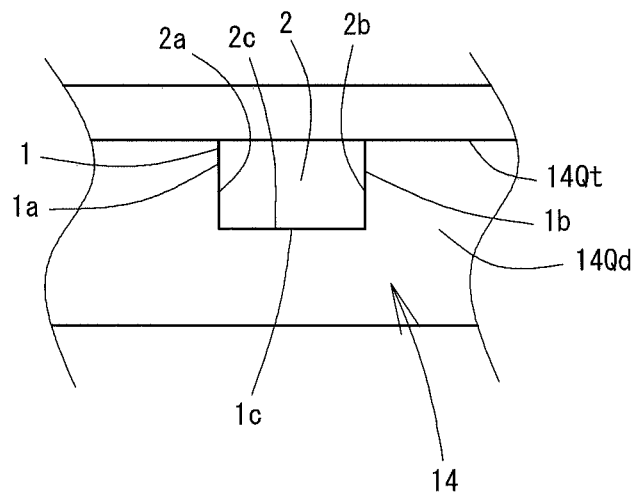
FIGS. 8A and 8B are an enlarged side view and an enlarged cross-sectional view of a state where the fitting concaved portion and the fitting convexed portion are fit to each other.
Figure 8B:
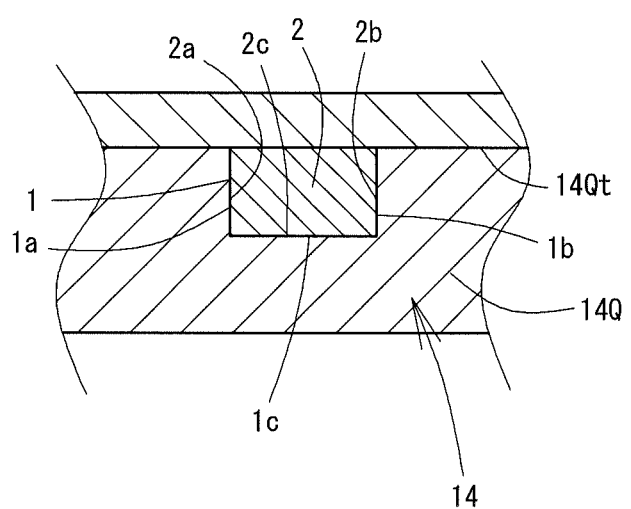

FIG. 8A is a side view of a state where the fitting concaved portion 1 and the fitting convexed portion 2 are fit to each other, and FIG. 8B is a cross-sectional view taken along a plane parallel to a side surface including the fitting concaved portion 1 and the fitting convexed portion 2.

In this embodiment, as shown in FIG. 1 and FIG. 2, the steering roll connector 10 mainly includes a cable housing 11, a retainer 41, and the rotation lock structure 51.

The cable housing 11 is generally cylindrical and has an insertion hole H running through the cable housing 11 in a direction of a rotation axis X of a steering wheel (up-down direction in FIG. 4). The insertion hole H is formed at a central part of the cable housing 11 as seen in a plan view. The insertion hole H is formed to have a diameter which allows a steering shaft (not shown) to be inserted thereto. The steering shaft projects from a steering column (not shown), and at a top end of the steering shaft, a steering wheel (not shown) for making a rotation operation is fixed.

The cable housing 11 is a generally cylindrical case including the fixed case 12 and the rotatable case 13 which are rotatable with respect to each other. As shown in FIG. 2 through FIG. 4, an accommodation space S for accommodating flat cables C in an appropriately wound state is formed inside the cable housing 11.

As shown in FIG. 5, the fixed case 12 includes the fixed-side ring plate 14 and the outer cylinder 15.

The fixed-side ring plate 14 includes a ring plate section 14P which is flat and ring-shaped, and a ring-plate cylindrical section 14Q which is cylindrical and projects perpendicularly from an outer circumferential edge of the ring plate section 14P toward the rotatable case 13. The outer cylinder 15 is a separate member from the fixed-side ring plate 14. The outer cylinder 15 is cylindrical and extends perpendicularly from the outer circumferential edge of the fixed-side ring plate 14 toward the rotatable case 13. An inner side surface 14Qs of the ring-plate cylindrical section 14Q has a diameter which is the same as the diameter of an outer side surface 15a of the outer cylinder 15.

As shown in FIG. 5 and FIGS. 6B, the fixed-side ring plate 14 includes a plurality of engaging hole sections 18 with a prescribed distance kept therebetween. The engaging hole sections 18 project perpendicularly from a top end 14Qt of the ring-plate cylindrical section 14Q toward the outer cylinder 15, and each have an engaging hole which is rectangular as seen from a side view.

The outer cylinder 15 includes engaging convexed sections 19 on the outer side surface 15a thereof, at positions corresponding to the engaging hole sections 18. The engaging convexed sections 19 project in a radial direction and each have a rectangular shape as seen in a side view which is generally the same as the shape of the engaging hole.

FIG. 6A shows height h2 from a bottom end 15b of the outer cylinder 15 to a top surface 19c of the engaging convexed section 19. FIG. 6B shows height h1 from a bottom surface 14b of the fixed-side ring plate 14 to a top surface 18c of the engaging hole. Height h2 is equal to, or slightly larger than, height h1.

FIG. 6A shows width w2 from a left side surface 19a to a right side surface 19b of the engaging convexed section 19. FIG. 6B shows width w1 from a left side surface 18a to a right side surface 18b of the engaging hole. Width w2 is slightly smaller than width w1 in order to facilitate engagement of the engaging convexed section 19 and the engaging hole section 18.

As shown in FIG. 5, FIG. 7A, FIG. 7B, FIG. 8A and FIG. 8B, the fixed-side ring plate 14 has the fitting concaved portion 1 at one prescribed position at the top end 14Qt of the ring-plate cylindrical section 14Q. The outer cylinder 15 includes the fitting convexed portion 2 at the position of the outer side surface 15a corresponding to the fitting concaved portion 1. The fitting concaved portion 1 and the fitting convexed portion 2 have the same shape.

This will be described in more detail. As shown in FIG. 7B, FIG. 8A and FIG. 8B, the fitting concaved portion 1 is recessed from the top end 14Qt of the ring-plate cylindrical section 14Q in a rectangular shape as seen in a side view. The fitting concaved portion 1 runs through the ring-plate cylindrical section 14Q in the radial direction and is generally rectangular as seen in a plan view. As shown in FIG. 7A, FIG. 8A and FIG. 8B, the fitting convexed portion 2 is a convexed portion having the same generally rectangular shape as that of the fitting concaved portion 1 as seen in a plan view and the same rectangular shape as that of the fitting concaved portion 1 as seen in a side view.

Circumferential length l1 and depth d1 of the fitting concaved portion 1 are respectively equal to circumferential length l2 and height w3 of the fitting convexed portion 2. Thickness t1 of the ring-plate cylindrical section 14Q in the radial direction, thickness t2 of the fitting concaved portion 1 in the radial direction, and thickness t3 of the fitting convexed portion 2 in the radial direction are equal to one another.

Height h3 from the bottom surface 14b of the fixed-side ring plate 14 to a bottom surface 1c of the fitting concaved portion 1 is equal to height h4 from the bottom end 15b of the outer cylinder 15 to a bottom surface 2c of the fitting convexed portion 2.

The fixed-side ring plate 14 and the outer cylinder 15 thus structured are located so as to have the same central axis. The engaging hole sections 18 of the fixed-side ring plate 14 and the corresponding engaging convexed sections 19 of the outer cylinder 15 are engaged with each other so as to be fixed to each other in the direction of the rotation axis X. In addition, the fitting convexed portion 2 of the outer cylinder 15 is fit into the fitting concaved portion 1 of the fixed-side ring plate 14, so that the inner side surface 14Qs of the fixed-side ring plate 14 contacts the outer side surface 15a of the outer cylinder 15, and also the bottom surface 14b of the fixed-side ring plate 14 contacts the bottom end 15b of the outer cylinder 15. Thus, the fixed case 12 is integrally structured.

The fixed case 12 is fixed to an appropriate member on the side of a vehicle body, for example, a combination bracket switch (not shown) of the steering column so as to be rotatable with respect to the steering wheel.

The fixed case 12 is provided with fixed case-side connectors 17.

The fixed case-side connectors 17 include a first fixed case-side connector 17A and a second fixed case-side connector 17B. The first fixed case-side connector 17A and the second fixed case-side connector 17B are located with a prescribed distance kept therebetween and outer to the outer cylinder 15, and connection openings thereof are directed in the same direction.

The rotatable case 13 includes a rotatable-side ring plate 21 formed to be ring-shaped and acting as a top plate, and an inner cylinder 22 having a cylindrical shape and extending perpendicularly from an inner circumferential edge of the rotatable-side ring plate 21.

The rotatable case 13 is rotatable integrally with the steering wheel. In more detail, the rotatable case 13 is rotatable with respect to the fixed case 12 about the same axis as that of the rotation axis X of the steering wheel.

The rotatable-side ring plate 21 is located so as to face the fixed-side ring plate 14 in the direction of the rotation axis X of the rotatable case 13. The direction of the rotation axis X of the rotatable case 13 is the same as the direction of the rotation axis of the steering wheel (up-down direction in FIG. 4).

The inner cylinder 22 is located so as to face the outer cylinder 15 in the radial direction (left-right direction in FIG. 4).

The rotatable case 13 is provided with a first rotatable case-side connector 23A and a second rotatable case-side connector 23B, which are rotatable integrally with the rotatable case 13.

The first rotatable case-side connector 23A and the first fixed case-side connector 17A, and the second rotatable case-side connector 23B and the second fixed case-side connector 17B, are electrically connected to each other by the flat cables C located in the accommodation space S.

The fixed case-side connectors 17 are each connected to a cable (not shown) drawn from an electrical circuit or the like on the side of the vehicle body in a lower column cover (not shown).

The rotatable case-side connectors 23 are each connected to a cable drawn from an electrical circuit of, for example, a horn switch, an airbag unit or the like.

As shown in FIG. 2 and FIG. 3, the retainer 41 includes a plurality of rotatable rollers 43 and a base ring 42. The retainer 41 is located so as to be rotatable in the accommodation space S, with the rotation axis X of the rotatable case 13 being the rotation center.

The rotatable rollers 43 are provided by the same number as that of roller supporting projection sections 45, and are axially supported by the roller supporting projection sections 45 respectively. The rotatable rollers 43 are each provided to be rotatable, with an axis parallel to the rotation axis X of the rotatable case 13 being the rotation center.

The base ring 42 includes a plate-like base ring main body 44 having a ring shape as seen in a plan view, the roller supporting projection sections 45, and outer-to-roller projection sections 46.

The base ring main body 44 is located on the fixed-side ring plate 14 so as to be slidable against the fixed-side ring plate 14 in a rotation direction thereof, and is rotatable with respect to the fixed case 12. The roller supporting projection sections 45 are provided at an equal interval in a circumferential direction of the base ring main body 44, and project upward so as to be capable of axially supporting the rotatable rollers 43. The outer-to roller projection sections 46 are provided outer to the roller supporting projection sections 45 in a radial direction thereof, and project upward with respect to the base ring main body 44. One of the outer-to roller projection sections 46 guides a turned-around part (reversed part Cr described later) of the flat cables C, which is turned around and wound along the corresponding rotatable roller 43 as described later, from a radially outer side.

Two flat cables C are accommodated in the accommodation space S, and are wound around therein in a layered state. One end, in a length direction, of one of the two layered flat cables C is connected to the first fixed case-side connector 17A, and one end, in the length direction, of the other flat cable C is connected to the second fixed case-side connector 17B.

The other end, in the length direction, of the one of the two layered flat cables C is connected to the first rotatable case-side connector 23A, and the other end, in the length direction, of the other flat cable C is connected to the second rotatable case-side connector 23B.

Such flat cables C are supported by the retainer 41 located to be rotatable with respect to the fixed-side ring plate 14 and is accommodated in a wound state in the accommodation space S in the cable housing 11.

This will be described in more detail. The flat cables C are drawn into the accommodation space S from the first fixed case-side connector 17A and the second fixed case-side connector 17B respectively. Thus, as shown in FIG. 3, an outside wound part Co is formed which is wound along an inner circumferential surface of the outer cylinder 15 of the fixed case 15 at a position outer to the retainer 41. Accordingly, base ends of the outside wound part Co are fixed at the positions of the fixed case-side connectors 17.

The two flat cables C are wound around in the accommodated space S in a layered state as described above, but in FIG. 3, such a structure is simplified and only one wound flat cable C is shown.

As represented by the two-dot chain line in FIG. 3, the flat cables C have the reversed part Cr in the middle thereof in the length direction. The reversed part Cr is turned around in a U shape and wound along one of the plurality of rotatable rollers 43.

After this part, the other ends of the flat cables C in the length direction are formed to be an inside wound part Ci which is wound along an outer circumferential surface of the inner cylinder 22 of the rotatable case 13 at a position inner to the retainer 41.

The flat cables C are finally drawn out of the accommodation space S and connected to the first rotatable case-side connector 23A and the second rotatable case-side connector 23B, respectively. Accordingly, the base ends of the inside wound part Ci are fixed at the positions of the rotatable case-side connectors 23.

As described above, by the rotation of the rotatable case 13 with respect to the fixed case 12, the outside wound part Co and the inside wound part Ci of the flat cables C are respectively wound and unwound, or vice versa, in the accommodation space S.

In this state, the reversed part Cr of the flat cables C is appropriately rotated together with the retainer 41 so as to follow the change of balance in the wound state between the outside wound part Co and the inside wound part Ci.

Owing to this, the steering roll connector 10 can always hold the flat cables C in an aligned wound state in the accommodation space S and can rotate the steering wheel smoothly.

The steering roll connector 10 having the above-described structure provides various functions and effects as described below.

Owing to the above-described structure of the engaging hole sections 18 and the engaging convexed sections 19, the top surface 18c of each engaging hole and the top surface 19c of the corresponding engaging convexed section 19 contact each other with no gap therebetween. Thus, the fixed-side ring plate 14 and the outer cylinder 15 are strongly fixed to each other in the direction of the rotation axis X.

By contrast, there is slight play at least between the left side surface 18a of each engaging hole and the left side surface 19a of the corresponding engaging convexed section 19, or between the right side surface 18b of each engaging hole and the right side surface 19b of the corresponding engaging convexed section 19.

Nonetheless, owing to the above-described structure of the fitting concaved portion 1 and the fitting convexed portion 2, as shown in FIGS. 8A and 8B, a fitting concaved portion left side surface 1a of the fitting concaved portion 1 and a fitting convexed portion left side surface 2a of the fitting convexed portion 2 contact each other, and a fitting concaved portion right side surface 1b of the fitting concaved portion 1 and a fitting convexed portion right side surface 2b of the fitting convexed portion 2 contact each other. Thus, the outer cylinder 15 is prevented from moving in the circumferential direction with respect to the fixed-side ring plate 14.

Therefore, in the steering roll connector 10, owing to the engagement of the engaging hole sections 18 and the engaging convexed sections 19, the fixed-side ring plate 14 and the outer cylinder 15 can be strongly fit to each other in the direction of the rotation axis X (see FIG. 4), and the fitting concaved portion 1 of the fixed-side ring plate 14 and the fitting convexed portion 2 of the outer cylinder 19 can contact each other in both of a clockwise circumferential direction and a counterclockwise circumferential direction. Therefore, the outer cylinder 15 is not easily moved in the circumferential direction with respect to the fixed-side ring plate 14. Thus, generation of squeaky noise, which would be caused by circumferential-direction ricketiness of the outer cylinder 15, can be suppressed.

Moreover, the work of fitting the engaging hole sections 18 and the engaging convexed sections 19 and fitting the fitting concaved portion 1 and the fitting convexed portion 2, in one direction (direction of the rotation axis X), can regulate the movement of the outer cylinder 15 with respect to the fixed-side ring plate 14 in the direction of the rotation axis X and also in the circumferential direction.

The fitting concaved portion 1 and the fitting convexed portion 2 are in contact with each other at both of two ends thereof in the circumferential direction. Therefore, merely one pair of the fitting concaved portion 1 and the fitting convexed portion 2 can suppress the ricketiness of the outer cylinder 15 in both of the clockwise circumferential direction and the counterclockwise circumferential direction.

The fitting concaved portion left side surface 1a of the fitting concaved portion 1 and the fitting convexed portion left side surface 2a of the fitting convexed portion 2, and the fitting concaved portion right side surface 1b of the fitting concaved portion 1 and the fitting convexed portion right side surface 2b of the fitting convexed portion 2, match each other in the radial direction. In other words, the radial direction of these surfaces is an in-plane direction. Therefore, when a force is applied in the circumferential direction, the direction of the force matches the direction perpendicular to the contact surface along which the fitting concaved portion left side surface 1a and the fitting convexed portion left side surface 2a contact each other, and the contact surface along which the fitting concaved portion right side surface 1b and the fitting convexed portion right side surface 2b contact each other. Thus, the movement of the outer cylinder 15 in the circumferential direction with respect to the fixed-side ring plate 14 can be regulated more effectively than in the case where the side surfaces contact at another angle.

The fitting concaved portion 1 and the fitting convexed portion 2 are provided over the entire thickness in the radial direction of the ring-plate cylindrical section 14Q of the fixed-side ring plate 14 and the outer cylinder 15. Therefore, the fitting concaved portion 1 and the fitting convexed portion 2 can contact each other in a large area size in the circumferential direction. Thus, the force of restricting the rotation in the circumferential direction can be made strong.

The fitting concaved portion 1 and the fitting convexed portion 2 are provided in the radial direction, and are respectively exposed to an outer side surface 14Qd of the ring-plate cylindrical section 14Q of the fixed-side ring plate 14 and the outer side surface 15a of the outer cylinder 15. Therefore, the fitting concaved portion 1 of the fixed-side ring plate 14 and the fitting convexed portion 2 of the outer cylinder 15 can be fit to each other visually. Thus, the fixed-side ring plate 14 and the outer cylinder 15 can be fit to each other easily.

Width w1 of the fitting concaved portion 1 in the circumferential direction and width w2 of the fitting convexed portion 2 in the circumferential direction are long as shown in this embodiment. Owing to this, when a force is applied to the fitting convexed portion 2 in the circumferential direction, deformation of the fitting convexed portion 2 in the circumferential direction can be suppressed small. Therefore, the generation of squeaky noise can be suppressed.

The present invention is not limited to the above-described embodiment and may be implemented in various other embodiments.

The rotatable connector device according to the present invention corresponds to the steering roll connector 10 in the embodiment; and in the same manner, the fixed-side ring plate rotation regulation section corresponds to the fitting concaved portion 1 or the fitting convexed portion 2;

the outer cylinder rotation regulation section corresponds to the fitting convexed portion 2 or the fitting concaved portion 1; and the contact surface corresponds to the fitting concaved portion left side surface 1a, the fitting convexed portion left side surface 2a, the fitting concaved portion right side surface 1b, or the fitting convexed portion right side surface 2b.

However, the present invention is not limited to the above-described embodiment, and can be implemented in many other embodiments.

For example, in the above embodiment, the fitting concaved portion 1 is provided at the top end 14Qt of the fixed-side ring plate 14 at a position between the first fixed case-side connector 17A and the second fixed case-side connector 17B, and the fitting convexed portion 2 is provided on the outer side surface 15a of the outer cylinder 15. Alternatively, the fitting concaved portion 1 and the fitting convexed portion 2 may be respectively provided at positions shifted by 180 degrees from the positions in the above embodiment at the top end 14Qt of the fixed-side ring plate 14 and on the outer side surface 15a of the outer cylinder 15.

Namely, the fitting concaved portion 1 and the fitting convexed portion 2 may be located at appropriate positions at which the position of the outer cylinder 15 with respect to the fixed-side ring plate 14 is considered to be changed at a largest degree in the circumferential direction, based on the structure of the steering roll connector 10.

Alternatively, for example, the circumferential length l1 of the fitting concaved portion 1 and the circumferential length l2 of the fitting convexed portion 2 may be longer than those in the above embodiment. Owing to this, the deformation of the fitting convexed portion 2 in the circumferential direction caused by a force applied thereto in the circumferential direction can be reduced, and thus the generation of squeaky noise can be more suppressed.

In the above embodiment, the fitting concaved portion 1 and the fitting convexed portion 2 are fit to each other so as to contact each other in the circumferential direction. Alternatively, for example, a fitting convexed portion projecting from an outer side surface of the fixed-side ring plate and a fitting convexed portion projecting from the outer side surface of the outer cylinder may contact each other.

In this case, the fitting convexed portion of the fixed-side ring plate is put into contact with the fitting convexed portion of the outer cylinder at one position on the outer side surface so as not to rotate in the clockwise direction, and another fitting convexed portion of the fixed-side ring plate is put into contact with another fitting convexed portion of the outer cylinder at another position on the outer side surface so as not to rotate in the counterclockwise direction. Thus, the rotation of the outer cylinder 15 in both of the clockwise and counterclockwise directions can be regulated.

The fitting concaved portion 1 and the fitting convexed portion 2 may be formed to be tapered. Alternatively, a concaved portion may be formed at each of the fitting concaved portion left side surface 1a and the fitting concaved portion right side surface 1b of the fitting concaved portion 1, and a convexed portion may be formed at each of the fitting convexed portion left side surface 2a and the fitting convexed portion right side surface 2b of the fitting convexed portion 2, at positions corresponding to the concaved portions at the fitting concaved portion 1.

Industrial Applicability

The present invention is usable for various types of rotatable connector devices for electrically connecting elements on the fixed side and elements on the rotatable side to each other.

REFERENCE SIGNS LIST
- 1 . . . Fitting concaved portion
- 1a . . . Fitting concaved portion left side surface
- 1b . . . Fitting concaved portion right side surface
- 2 . . . Fitting convexed portion
- 2a . . . Fitting convexed portion left side surface
- 2b . . . Fitting convexed portion right side surface
- 10 . . . Steering roll connector
- 12 . . . Fixed case
- 13 . . . Rotatable case
- 14 . . . Fixed-side ring plate
- 15 . . . Outer cylinder
- 18 . . . Engaging hole section
- 19 . . . Engaging convexed section
- 21 . . . Rotatable-side ring plate
- 22 . . . Inner cylinder
- C . . . Flat cable
- S . . . Accommodation space
- X . . . Rotation axis

The invention claimed is:

1. A rotatable connector device, comprising:
a fixed case including a ring-shaped fixed-side ring plate and an outer cylinder having a cylindrical shape and extending from an outer circumferential edge of the fixed-side ring plate perpendicularly to a planar surface of the fixed-side ring plate; and
a rotatable case including a ring-shaped rotatable-side ring plate and an inner cylinder having a cylindrical shape and extending from an inner circumferential edge of the rotatable-side ring plate perpendicularly to a planar surface of the rotatable-side ring plate toward the fixed case;

wherein:
the fixed case and the rotatable case are fit to each other so as to be rotatable with respect to each other in a clockwise direction and a counterclockwise direction;
an accommodation section is defined by the fixed-side ring plate and the outer cylinder of the fixed case and the rotatable-side ring plate and the inner cylinder of the rotatable case;
in the accommodation section, flat cables for electrically connecting the fixed case and the rotatable case to each other are accommodated in a wound state;
the fixed-side ring plate and the outer cylinder are formed of different members; a fixed-side ring plate rotation regulation section is provided at the outer circumferential edge of the fixed-side ring plate; an outer cylinder rotation regulation section is provided at an outer circumferential edge of the outer cylinder, at a position corresponding to the fixed-side ring plate rotation regulation section;
the fixed-side ring plate and the outer cylinder are aligned so as to have the same rotation axis and are fit to each other in a direction of the rotation axis;
the fixed-side ring plate rotation regulation section is put into contact with the outer cylinder rotation regulation section so as not to rotate in either the clockwise direction or the counterclockwise direction about the rotation axis;
the fixed-side ring plate includes a plurality of engaging hole sections each having an engaging hole, the plurality of engaging hole sections projecting perpendicularly from the outer circumferential edge toward the outer cylinder and located at a prescribed interval in a circumferential direction; the outer cylinder includes a plurality of engaging convexed sections on an outer surface thereof at positions corresponding to the engaging hole sections;
the plurality of engaging convexed sections project radially outward and located at a prescribed interval; and
the fixed-side ring plate and the outer cylinder are engaged with each other by insertion of the engaging convexed sections into the engaging hole sections in the direction of the rotation axis.

2. The rotatable connector device according to claim 1, wherein:
either one of the fixed-side ring plate rotation regulation section and the outer cylinder rotation regulation section is a fitting convexed portion, and the other of the fixed-side ring plate rotation regulation section and the outer cylinder rotation regulation section is a fitting concaved portion; and the fitting convexed portion is in contact with, and thus is fit to, the fitting concaved portion at both of two ends thereof in the circumferential direction.

3. The rotatable connector device according to claim 2, wherein a contact surface along which the fitting convexed portion and the fitting concaved portion contact each other is in a radial direction.

* * * * *